United States Patent
Al-Khayat et al.

(10) Patent No.: US 7,619,905 B2
(45) Date of Patent: Nov. 17, 2009

(54) METHOD OF CONTROLLING CONNECTION OF A SUPPLY OF AC POWER TO A LOAD AND TO A POWER SUPPLY GRID

(75) Inventors: Nazar Al-Khayat, Rutlund (GB); Wlodzimierz Koczara, Warszawa (PL); Emile Ernest, Stamford (PL)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 330 days.

(21) Appl. No.: 10/579,433

(22) PCT Filed: Nov. 8, 2004

(86) PCT No.: PCT/GB2004/004720

§ 371 (c)(1), (2), (4) Date: Jun. 14, 2006

(87) PCT Pub. No.: WO2005/048433

PCT Pub. Date: Nov. 8, 2004

(65) Prior Publication Data

US 2007/0013190 A1     Jan. 18, 2007

(30) Foreign Application Priority Data

Nov. 7, 2003  (GB) ................................ 0326070.0

(51) Int. Cl.
*H02J 3/00*     (2006.01)
*H02M 5/40*    (2006.01)
(52) U.S. Cl. .......................................... 363/34; 322/25
(58) Field of Classification Search .................. 363/34, 363/50, 95; 322/7, 16, 19, 24, 25, 29
See application file for complete search history.

(56) References Cited

U.S. PATENT DOCUMENTS 4,876,637 A * 10/1989 Mose et al. .................... 363/37

(Continued)

FOREIGN PATENT DOCUMENTS

EP        0570976        11/1993

(Continued)

OTHER PUBLICATIONS

Written Opinion of the International Searching Authority issued in International Application No. PCT/GB2004/004720.

(Continued)

*Primary Examiner*—Edward Tso
*Assistant Examiner*—Arun Williams
(74) *Attorney, Agent, or Firm*—Hamre, Schumann, Mueller & Larson, P.C.

(57) ABSTRACT

A method of controlling connection of an AC power output to a load and power supply grid. The power output is produced by an AC power generating system which includes an AC/AC converter and is independently operable to supply power to the load. The converter is controlled in accordance with a reference generated within the system. To connect the power output to the power supply grid and to supply the load, the reference is replaced by another reference derived from the voltage of the grid, so that the converter is controlled by that other reference, when the power output is connected to the grid and supplies power required by the load. When the power output is disconnected from the grid or loss of the grid voltage occurs, the reference replaces the other reference, and the power generating system operates independently continuing to supply power required by the load without interruption.

22 Claims, 1 Drawing Sheet

U.S. PATENT DOCUMENTS

Figure 1:
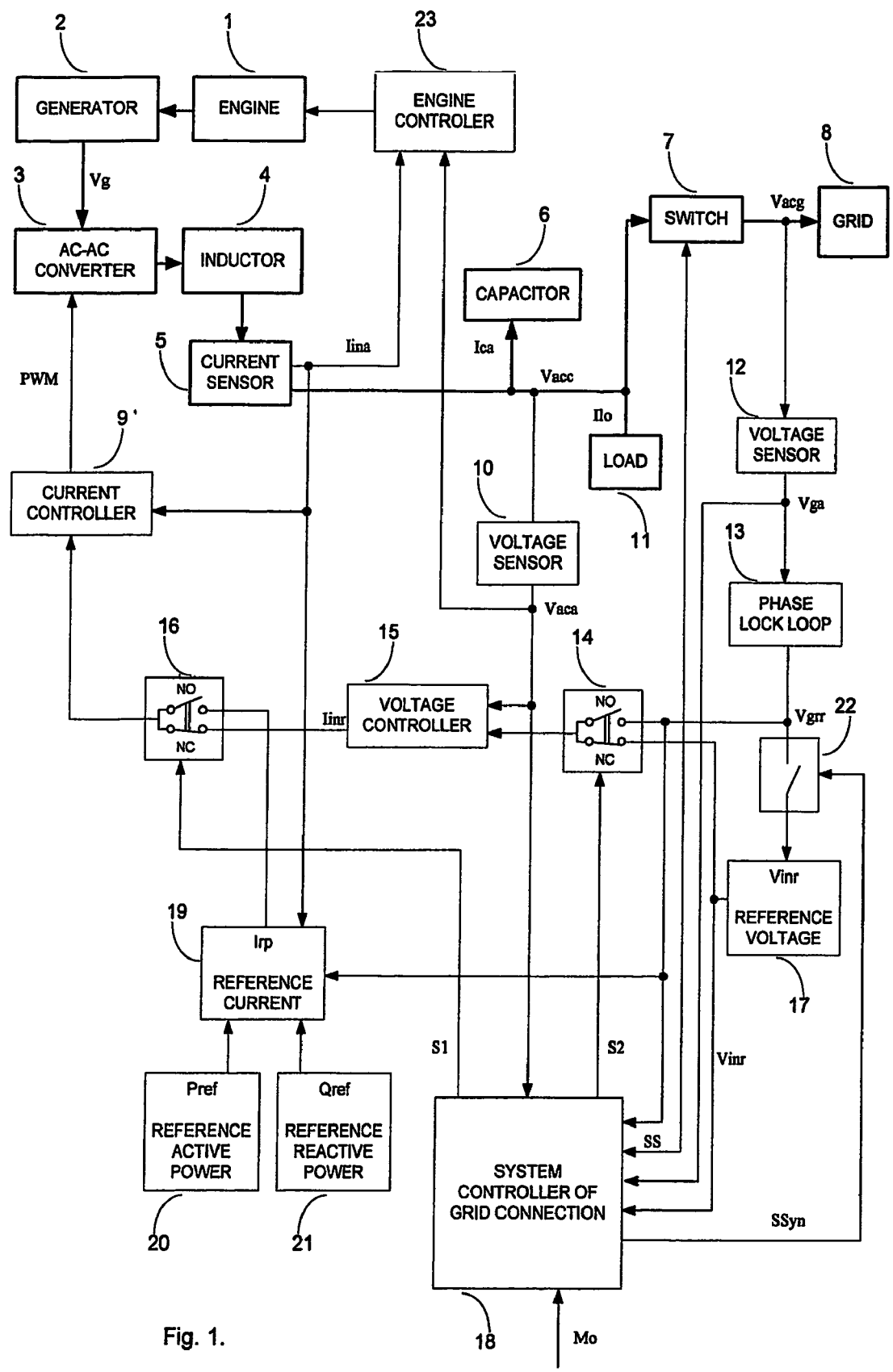

| | | | |
|---|---|---|---|
| 6,219,623 B1* | 4/2001 | Wills | 702/60 |
| 6,282,104 B1* | 8/2001 | Kern | 363/34 |
| 6,411,065 B1 | 6/2002 | Underwood et al. | |
| 6,801,019 B2 | 10/2004 | Haydock et al. | |
| 7,202,638 B2* | 4/2007 | Ye et al. | 322/37 |
| 2001/0056330 A1* | 12/2001 | Wills | 702/60 |
| 2002/0030365 A1 | 3/2002 | Underwood et al. | |
| 2002/0190695 A1* | 12/2002 | Wall et al. | 322/17 |
| 2003/0016548 A1* | 1/2003 | Tassitino et al. | 363/131 |
| 2003/0080741 A1* | 5/2003 | LeRow et al. | 324/320 |
| 2004/0145357 A1* | 7/2004 | Lynch et al. | 323/208 |
| 2004/0174652 A1* | 9/2004 | Lewis | 361/118 |
| 2005/0073152 A1* | 4/2005 | Gupta et al. | 290/52 |
| 2006/0050458 A1* | 3/2006 | Johnson | 361/62 |
| 2006/0062031 A1* | 3/2006 | Kim et al. | 363/89 |

FOREIGN PATENT DOCUMENTS

| | | |
|---|---|---|
| JP | 06-335169 A | 12/1994 |
| JP | 11-196531 A | 7/1999 |
| JP | 2001-211695 A | 8/2001 |
| WO | WO 01/56133 | 8/2001 |

OTHER PUBLICATIONS

Official Action issued by the Japanese Patent office Oct. 10, 2008, and English translation thereof.

* cited by examiner

METHOD OF CONTROLLING CONNECTION OF A SUPPLY OF AC POWER TO A LOAD AND TO A POWER SUPPLY GRID

This invention relates to an AC power generating system and more particularly to a method and system for controlling connection of a supply of AC power to a load and to a power supply grid.

US-A-2002/0030365 discloses a method of controlling connection of a supply of AC power to a load and to a power supply grid, the supply of AC power being generated by an AC power generating system of the kind that comprises a source of power arranged to provide an electrical output, converter means for generating an AC power output to supply the load from the electrical output, and control means which are operable to control the operation of the converter means and thereby to supply the power required to the load both when the AC power output of the AC power generating system is connected to the power supply grid as well as to the load, which is referred to as the on-line state, and during independent operation of the AC power generating system to supply the load including in the event of disconnection of the AC power output from the power supply grid, which is referred to as the off-line state, the control means being operable in response to signals derived from sensed current and/or voltage of an electrical output which is generated by the converter means from the electrical output of the source of power, wherein the current and voltage of the AC power output and the voltage of the power supply grid are monitored. Such an AC power generating system will be referred to in this description as an AC power generating system of the kind referred to hereinbefore.

The AC power generating system disclosed in US2002/0030365 may transition from the power on-line state to the power off-line state. The power off-line state performs the functions of opening the contactor that connects the system to the grid, switching the main inverter of the system to a voltage mode (in contrast to the power on-line state which enables the main inverter in a current mode) and setting the power level to a nominal level to power local loads. In the on-line state, the system samples the grid frequency and synchronizes its AC power output voltage with the voltage of the grid. When the line power unit is operating in a stand-alone mode or when the utility grid is not available (i.e. off-line) it is necessary for the system to synthesize a frequency so that the output power frequency is self-regulating.

WO01/56133 discloses an AC power generating system of the kind that comprises a controllable source of power arranged to provide a variable voltage and/or current electrical output, convertor means for generating an AC power output to supply a load from the variable voltage and/or current electrical output such that the AC power output is substantially independent of variations in the electrical output of the controllable source, and control means which are operable to control the operation of the controllable source and the convertor means and thereby to supply the power required by the load, the control means being operable in response to signals derived from sensed current and/or voltage of an electrical output which is generated by the convertor means from the electrical output of the controllable source and which is substantially independent of variations in the electrical output of the controllable source.

During normal independent operation of the generating set described and illustrated in WO01/56133, the output AC voltage is controlled in accordance with one or more references which are generated by or within the generating set or as it is being set up for operation. Active and reactive power consumption is dependent on loads to which the AC power output of the generating set is connected.

An object of this invention is to provide for improved connection and disconnection of the AC power output of an AC power generating system of the kind referred to hereinbefore to a power supply grid.

Connection and/or disconnection of the AC power output of an AC power generating system of the kind referred to hereinbefore to a power supply grid needs to take account of the fact that the grid voltage may be out of phase and at a different frequency to the AC power output of the AC power generating system of the kind referred to hereinbefore when the latter is being operated independently.

Broadly in accordance with this invention the control of the AC power output of an AC power generating system of the kind referred to hereinbefore is disabled and the AC power output of the AC power generating system of the kind referred to hereinbefore is brought into harmony with the grid voltage, both in phase and frequency. By this invention, one or more references that are generated by or within the generating set or that were established as the generating set was being set up for operation and which determined the AC output voltage, are replaced by references derived from the grid data. Whereas only the AC output voltage of an AC power generating system of the kind referred to hereinbefore is controlled during independent operation of that system, active and reactive power transmitted to the grid are adjusted and controlled when the AC power output of the AC power generating system of the kind referred to hereinbefore is connected to the power supply grid.

According to one aspect of this invention there is provided a method of controlling connection of a supply of AC power to a load and to a power supply grid, the supply of AC power being generated by an AC power generating system of the kind that comprises a source of power arranged to provide an electrical output, a converter which generates an AC power output to supply the load from the electrical output, and a control unit operable to control the operation of the converter means and thereby to supply the power required to the load both when the AC power output of the AC power generating system is connected to the power supply grid, as well as to the load and during independent operation of the AC power generating system to supply the load including in the event of disconnection of the AC power output from the power supply grid, the control unit being operable in response to signals derived from sensed current and/or voltage of an electrical output which is generated by the converter from the electrical output of the source of power, wherein the current and voltage of the AC power output and the voltage of the power supply grid are monitored, and one reference which is derived from the monitored AC power output voltage and which is used as a reference in the operation of the converter to control the generation of the AC power output during independent operation of the AC power generating system to supply the load is replaced by another reference which is derived from the monitored grid voltage when the AC power output is to be connected to the power supply grid such that generation of the AC power output by the convener of the AC power generating system is controlled in accordance with the other reference that is derived from the monitored grid voltage when the AC power output of the AC power generating system is connected to the power supply grid as well as supplying the power required by the load.

Preferred features of a method which embodies this invention arc provided in the following.

A method of controlling connection of a supply of AC power to a load and to a power supply grid wherein, in the event of disconnection of the AC power output from the power supply grid or of loss of the grid voltage, said other reference is replaced by said one reference with which it is substantially overlapping in phase and amplitude so that said AC power generating system operates independently and continues substantially without interruption to supply the power required by the load.

A method of controlling connection of a supply of AC power to a load and to a power supply grid, wherein the source of power is controllable and provides a variable voltage and/or current electrical output, the AC power output generated by the converter for supply to the load being substantially independent of variations in the electrical output of the controllable source and said control unit being operable to control the operation of said controllable source as well as the operation of said converter.

A method of controlling connection of a supply of AC power to a load and to a power supply grid, including controlling the operation of said controllable source by said control unit in response to the monitored current and voltage of the AC power output when the AC power output is connected to the power supply grid so that active and reactive power that are transmitted to the power supply grid are adjusted and controlled in accordance with the voltage of the grid.

A method of controlling connection of a supply of AC power to a load and to a power supply grid, wherein the AC power output current for each phase is monitored between the inductor and the capacitor of an LC filter for that phase.

A method of controlling connection of a supply of AC power to a load and to a power supply grid includes comparing one output signal produced by a voltage reference generator with the monitored AC power output voltage in a voltage controller which responds by producing said one reference.

A method of controlling connection of a supply of AC power to a load and to a power supply grid includes deriving a voltage reference signal from the monitored grid voltage, feeding that voltage reference signal to said voltage reference generator, operating said voltage reference generator to modify said one output signal so as to change its phase and amplitude progressively towards those of said voltage reference signal, and delaying connection of said AC power output to the grid until after said one reference and said voltage reference signal are substantially overlapping in phase and amplitude.

A method of controlling connection of a supply of AC power to a load and to a power supply grid, wherein said voltage reference signal is derived from said monitored grid voltage by feeding said monitored grid voltage to an input of a phase lock loop, said voltage reference signal being the output of said phase lock loop.

A method of controlling connection of a supply of AC power to a load and to a power supply grid includes feeding said voltage reference signal to said voltage controller instead of said one output signal, and operating said voltage controller to compare said voltage reference signal with said monitored AC output voltage to produce said one reference once said one reference signal and said voltage reference signal are substantially overlapping in phase and amplitude.

A method of controlling connection of a supply of AC power to a load and to a power supply grid, wherein said one reference is replaced by said other reference after said one output signal has been replaced by said voltage reference signal.

A method of controlling connection of a supply of AC power to a load and to a power supply grid including deriving said other reference from said voltage reference signal.

A method of controlling connection of a supply of AC power to a load and to a power supply grid, wherein said other reference is also derived from an active power reference and a reactive power reference.

A method of controlling connection of a supply of AC power to a load and to a power supply grid, wherein said other reference is also derived from said monitored AC power output active current.

A method of controlling connection of a supply of AC power to a load and to a power supply grid, including reconnecting said one output signal to said voltage controller and replacing said other reference by said one reference in the event of disconnection of the AC power output from the power supply grid or loss of the grid voltage.

According to another aspect of this invention there is provided a system which controls connection of a supply of AC power to a load and to a power supply grid, the supply of AC power being generated by an AC power generating system of the kind that comprises a source of power arranged to provide an electrical output, a converter for generating an AC power output to supply the load from the electrical output, and a control unit operable to control the operation of the converter and thereby to supply the power required to the load both when the AC power output of the AC power generating system is connected to the power supply grid as well as to the load and during independent operation of the AC power generating system to supply the load including in the event of disconnection of the AC power output from the power supply grid, the control unit being operable. in response to signals derived from sensed current and/or voltage of an electrical output which is generated by the converter from the electrical output of the source of power, the system being operable to monitor the current and voltage of the AC power output and the voltage of the power supply grid, to derive one reference from the monitored AC power output voltage, said one reference being for use as a reference in the operation of the converter to control the generation of that AC power output during independent operation of the AC power generating system to supply the load, and to derive another reference from the monitored grid voltage, said control unit being operable to replace said one reference by the other reference which is derived from the monitored grid voltage when the AC power output is connected to the power supply grid such that generation of the AC power output by the converter of the AC power generating system is controlled in accordance with the other reference that is derived from the monitored grid voltage when the AC power output of the AC power generating system is connected to the power supply grid as well as supplying the power required by the load.

Preferred features of a method which embodies this invention are provided in the following.

A system which controls connection of a supply of AC power to a load and to a power supply grid, wherein said control unit is operable to replace said other reference by said one reference with which said other reference is overlapping in phase and amplitude so that said AC power generating system operates independently and continues substantially without interruption to supply the power required by the load.

A system which controls connection of a supply of AC power to a load and to a power supply grid, wherein the source of power is controllable and provides a variable voltage and/or current electrical output, the AC power output generated by the converter for supply to the load being substantially independent of variations in the electrical output of the controllable source and said control unit being operable to control the operation of said controllable source as well as the operation of said converter.

A system which controls connection of a supply of AC power to a load and to a power supply grid, wherein said control unit that is operable to control the operation of the controllable source is responsive to the monitored current and voltage of the AC power output when the AC power output is connected to the power supply grid so that active and reactive power that are transmitted to the power supply grid are adjusted and controlled in accordance with the voltage of the grid.

A system which controls connection of a supply of AC power to a load and to a power supply grid, wherein the AC power output current for each phase of the AC power output is monitored between the inductor and capacitor of an LC filter for that phase.

A system which controls connection of a supply of AC power to a load and to a power supply grid including voltage reference generator means which are operable to produce one output signal and a voltage controller which is operable to compare the monitored AC power output voltage with said one output signal and thereby to produce said one reference.

A system which controls connection of a supply of AC power to a load and to a power supply grid, wherein a voltage reference signal which is derived from the monitored grid voltage is fed to said voltage reference generator, said voltage reference generator being operable to modify said one output signal so as to change its phase and amplitude progressively towards those of said voltage reference signal, connection of said AC power output to the grid being delayed until after said one reference and said voltage reference signal are substantially overlapping in phase and amplitude.

A system which controls connection of a supply of AC power to a load and to a power supply grid, including a phase lock loop having an input and an output, wherein said monitored grid voltage is fed to the input of the phase lock loop and said voltage reference signal is emitted from the output of said phase lock loop.

A system which controls connection of a supply of AC power to a load and to a power supply grid, including first a transfer switch operable once said one reference signal and said voltage reference signal are substantially overlapping in phase and amplitude, so that said voltage reference signal is fed to said voltage controller instead of said one output signal for comparison with said monitored AC output voltage to produce said one reference.

A system which controls connection of a supply of AC power to a load and to a power supply grid, including a second transfer switch operable once said one output signal has been replaced by said voltage reference signal, so that said one reference is replaced by said other reference.

A system which controls connection of a supply of AC power to a load and to a power supply grid, wherein said other reference is derived from said voltage reference signal.

A system which controls connection of a supply of AC power to a load and to a power supply grid, wherein said other reference is also derived from an active power reference and a reactive power reference.

A system which controls connection of a supply of AC power to a load and to a power supply grid, wherein said other reference is also derived from said monitored AC power output active current.

A system which controls connection of a supply of AC power to a load and to a power supply grid, wherein, the first and second transfer switches are operable to reconnect said one output signal to said voltage controller and to replace said other reference by said one reference so that said power supply apparatus operates independently in the event of disconnection of the AC power output of the AC power generating system from the power supply grid or of loss of grid voltage.

One embodiment of this invention is described now by way of example only with reference to the accompanying drawing which is a circuit diagram of an electric power generating set which automatically varies its speed to match load variation at any time when it is operated independently and control means for that generating set to control its connection to a power supply grid. The hardware components of the generating set and the grid are shown in heavy black lines and the other elements which are shown in lighter lines are software components with which a controlling microprocessor is programmed.

The drawing shows components of an electrical power generating set in diagrammatic form. The generating set includes an engine (1) which is mechanically coupled with a rotor of a generator (2) whereby to rotate the rotor relative to a stator of the generator (2) and thereby to generate a three phase variable frequency and voltage AC output (Vg) from the generator (2).

The three phase variable frequency and voltage output (Vg) of the generator (2) is fed to an AC-AC converter (3). The AC-AC converter (3) is operable to generate a three phase AC power output with a neutral (Vacc) for supply to a load (11) from the three phase variable frequency and voltage output (Vg) of the generator (2) such that the AC power output (Vacc), which is the AC power output of the generating system, is substantially independent of variations in the output (Vg) of the generator (2). The AC-AC convertor (3) may comprise the full-wave bridge rectifier (Re), the booster (BO) which establishes an intermediate DC voltage and the invertor (INV) which converts that intermediate DC voltage into a three phase AC power output which is substantially independent of variations in the output (Vg) of the generator (2), such as is described with reference to and illustrated in either FIGS. 1A and 1B or FIGS. 7A and 7B or FIGS. 9A and 9B of the International publication WO01/56133.

WO01/56133 explains that the reference levels for the required value of output frequency and voltage of the generating set described with reference to and illustrated in either FIGS. 1A and 1B, FIGS. 7A and 7B or FIGS. 9A and 9B of that document are provided by an amplitude and frequency correction circuit (AFC) which responds to signals indicative of the sensed intermediate DC voltage and current and to engine speed as well as to one or more preselected reference signals. The reference level signal for each phase is fed to an invertor controller (IC) which provides pulse width modulated signals which control switching of the transistors of the invertor (INV). The corresponding pulse width modulated signals (PWM) for the AC-AC convertor (3) of the generating set illustrated in the accompanying drawing are provided by a current controller (9). Provision of the necessary reference levels to the current controller (9) is described in detail below.

As is the case with each of the generating sets described with reference to and as illustrated in FIGS. 1A and 1B, FIGS. 7A and 7B and FIGS. 9A and 9B of WO01/56133 which is incorporated herein by reference, each phase of the three phase AC power output (Vacc) of the AC-AC convertor (3) is fed to the load (11) through a respective LC filter which comprises an inductor (4) and a capacitor (6). The current sensor (5), which is connected between each inductor (4) and the respective capacitor (6), senses the current (Iina) drawn by the load (11) from each inductor (4). A voltage sensor (10) senses the voltage of each phase of the filtered three phase AC power output (Vacc) from the AC-AC convertor (3) that is fed to the load (11). Output signals, (Iina and Vaca) emitted respectively by the current sensor (5) and the voltage sensor (10) and indicative of the respective sensed current or voltage, are fed to an engine controller (23) which is operable to control the speed of the engine (1). Hence the engine controller (23) is operable to adjust the speed of the engine (1) proportionally to the active power supplied to the load (11) calculated from the inductor current signal (Iina) and the output voltage signal (Vaca). The inductor current signal (Iina) emitted from the current sensor (5) is also fed to the current controller (9) and to a current reference generator (19) which generates a reference signal (Irp) which it derives from the inductor current signal (Iina). The output voltage signal (Vaca) is also fed to one input of a voltage controller (15). A normally closed transfer switch (14) transmits an output signal (Vinr) from a voltage reference generator (17) to another input of the voltage controller (15) when that transfer switch (14) is in its normally closed state. The voltage controller (15) emits a reference (Iinr) which it generates from a comparison of the output signal (Vinr) received from the voltage reference generator (17) via the transfer switch (14) and the sensed filtered AC output power voltage (Vaca) sensed by the voltage sensor (10). A second normally closed transfer switch (16) transmits the reference signal (Iinr) to the current controller (9) when in its normally closed state.

The reference (Iinr) generated by the voltage controller (15) is used as the reference level for the required value of output frequency and voltage emitted by the AC-AC convertor (3) as described above, since the current controller (9) compares the inductor current signal (Iina) with the reference (Vinr) to produce the pulse width modulated signals (PWM) for controlling switching of transistors of the AC-AC convertor (3) during normal independent operation of the generating set.

It should be understood that the functions of the current controller (9), the voltage sensor (10), the engine controller (23), the transfer switches (14 and 16), the voltage controller (15), the voltage reference generator (17) and the current reference generator (19) are provided by a suitably programmed digital microprocessor which is incorporated in a grid connection system controller (18) to one input of which is fed the output voltage signal (Vaca) for the purpose of calculating various parameters such as the rms values of output voltage and output current.

In order to connect the AC power output of the generating set to a power supply grid (8), in addition to supplying the power required by the load (11), the voltage control arrangement of the generating set which is based on the reference signal (Iinr) emitted by the voltage controller (15) needs to be disabled and the AC output voltage (Vacc) of the generating set needs to be brought into equality and synchronism with the voltage of the power supply grid (8) since the latter is liable to be out of phase and at a different frequency from the AC power output (Vacc) of the generating set.

A switch (7), which is a standard, non-controlled contactor, is provided for connecting the AC power output (Vacc) of the generating set that is connected to the load (11) to the power supply grid (8). However before the switch (7) is activated by the grid connection system controller (18) to connect the AC power output (Vacc) of the generating set to the grid (8), the grid voltage (Vacg) is monitored by a voltage sensor (12) which emits a voltage reference signal (Vga) which is indicative of the voltage (Vacg) of the grid (8) and which is connected to an input of a phase lock loop system (13). The phase lock loop system (13) produces a sinusoidal signal (Vgrr) which follows the grid voltage (Vacg) very precisely and which is fed to both another controllable switch (22) and to the normally open terminal of the transfer switch (14). The controllable switch (22) is normally open but is closed by an actuating signal (SSyn) fed to it by the grid connection system controller (18) when the latter receives a signal Mo which is for initiating connection of the generating set to the power supply grid (8). The output (Vga) of the voltage sensor (12) which is indicative of the voltage (Vacg) of the grid (8), the output signal (Vinr) from the voltage reference generator (17) and the output (Vgrr) of the phase lock loop system (13) are fed to the grid connection system controller (18). The normally open switch (22) is closed by the signal (Ssyn) fed to it by the grid connection system controller (18) so that the output (Vgrr) of the phase lock loop system (13) is fed to the voltage reference generator (17). The voltage reference generator (17) reacts to receipt of the signal (Vgrr) by slowly and smoothly changing its output signal (Vinr) towards the output (Vgrr) of the phase lock loop system (13). This continues until the two signals (Vinr) and (Vgrr) are overlapping in both amplitude and frequency. When the grid connection system controller (18) senses that that overlapping condition has been achieved, the grid connection system controller (18) produces a signal (S2) which actuates a change of state of the transfer switch (14) from its normally closed state to the open state in which the output (Vgrr) of the phase lock loop system (13) is fed to the voltage controller (15) in place of the output (Vinr) of the voltage reference generator (17). Hence the reference (Iinr) emitted by the voltage controller (15) is derived from a comparison of the output (Vgrr) of the phase lock loop system (13) which is derived from the voltage (Vacc) of the grid (8), with the voltage of the filtered AC power output of the AC-AC convertor (3). The grid connection system controller (18) then produces a signal (S1) which actuates a change of state of the second transfer switch (16) from its normally closed state to its open state which results in disconnection of the reference (Iinr) from the current controller (9) and its replacement by another reference (Irp) which is emitted by the current reference generator (19) which receives the output (Vgrr) from the phase lock loop system (13) as well as two reference signals (Pref) and (Qref) from an active power reference generator (20) and a reactive power reference generator (21), the other reference (Irp) being generated by the reference current generator (19) from the three inputs it receives, namely (Vgrr), (Pref) and (Qref). The active power reference (Pref) and the reactive power reference (Qref) may be determined arbitrarily or may be derived by feedback from the generating set.

Once the second transfer switch (16) has been actuated to change from its normally closed state to its open state, the grid connection controller (18) emits an actuating signal (SS) to change the state of the controllable switch (7) to connect the filtered AC power output (Vaca) of the AC-AC converter (3) to the grid (8).

Whereas only the AC power output voltage (Vacc) of the generating set is controlled during independent operation of that generating set, active and reactive power transmitted to the grid (8) from the generating set are adjusted and controlled when the generating set is controlled by a reference derived from the voltage (Vacg) of the grid (8). The AC power output voltage (Vacc) of the generating set is reoriented into synchronism with the voltage (Vacg) of the grid (8) quickly since the generating set is controlled by high frequency switching power transistors or other fully controllable power electronic devices and because the energy stored in the LC filter (4 and 6) that filters the AC power output (Vacc) of the AC-AC convertor (3) is low. Further, since the connection of the AC power output (Vacc) of the generating set to the grid (8) is delayed until the reference fed to the current controller (9) is brought into a overlapping relationship with the grid voltage in both amplitude and frequency, the risk of disturbance of the operation of the load (11) is avoided.

When the controllable switch (7) is disconnected or in the event that the voltage (Vacg) of the power supply grid (8) fails, the grid connection system controller (18) would respond by actuating instantaneous change of state of the transfer switches (14 and 16) from their opened states t6 their normally closed states so that the generating set is operated independently on the basis of the reference (Vinr) generated by the reference voltage generator (17) and its comparison with the voltage of the filtered AC power output (Vacc) of the generator set in the voltage controller (15) to produce the reference that is fed to the current controller (9) for independent operation of the generating set. Since the reference signal (Vinr) was almost overlapping with the output (Vgrr) of the phase lock loop system (13) when the switch (7) was disconnected or the grid voltage failed, there is no significant disturbance in the output voltage generation by the independent operation of the generator set.

The functions of the phase lock loop system (13), the grid connection system controller (18), the active power reference generator (20), the reactive power reference generator (21) and the switch (22) are provided by a suitably programmed microprocessor which may be the same microprocessor as provided the functions of the current controller (9), the voltage sensor (10), the engine controller (12), the transfer switches (14 and 16), the voltage controller (15), the voltage reference generator (17) and the current reference generator (19).

In another embodiment, the inductor current signal (Ina) may be fed to the voltage reference generator (17) rather than to the current reference generator (19) as described above with reference to the drawing, so that the reference voltage (Vinr) that is received at the other input of the voltage controller (15) via the transfer switch (14) when the latter is in its normally closed state would be derived from the inductor current signal (Iina).

The arrangement of the embodiments of this invention that are described above enables use of a standard, non-controlled contactor as the switch (7) without any inrush in current and voltages.

The invention claimed is:

1. A method of controlling connection of a supply of AC power to a load and to a power supply grid, the supply of AC power being generated by an AC power generating system of the kind that comprises a source of power arranged to provide an electrical output, a converter which generates an AC power output to supply the load from the electrical output, and a control unit operable to control the operation of the converter and thereby to supply the power required to the load both when the AC power output of the AC power generating system is connected to the power supply grid, as well as to the load and during independent operation of the AC power generating system to supply the load including in the event of disconnection of the AC power output from the power supply grid, the control unit being operable in response to signals derived from sensed current and/or voltage of an electrical output which is generated by the converter from the electrical output of the source of power, wherein the current and voltage of the AC power output and the voltage of the power supply grid are monitored, and one reference which is derived from the monitored AC power output voltage and which is used as a reference in the operation of the converter to control the generation of the AC power output during independent operation of the AC power generating system to supply the load is replaced by another reference which is derived from the monitored grid voltage when the AC power output is to be connected to the power supply grid such that generation of the AC power output by the converter of the AC power generating system is controlled in accordance with the other reference that is derived from the monitored grid voltage when the AC power output of the AC power generating system is connected to the power supply grid as well as supplying the power required by the load, so that the voltage of the AC power output is changed to correspond to the grid voltage in phase and frequency, the method including the steps of:
comparing one output signal produced by a voltage reference generator with the monitored AC power output voltage in a voltage controller which responds by producing said one reference;
deriving a voltage reference signal from the monitored grid voltage, feeding that voltage reference signal to said voltage reference generator, operating said voltage reference generator to modify said one output signal so as to change its phase and amplitude progressively towards those of said voltage reference signal, and delaying connection of said AC power output to the grid until after said one reference and said voltage reference signal are substantially overlapping in phase and amplitude; and
feeding said voltage reference signal to said voltage controller instead of said one output signal, and operating said voltage controller to compare said voltage reference signal with said monitored AC output voltage to produce said one reference once said one reference signal and said voltage reference signal are substantially overlapping in phase and amplitude.

2. A method of controlling connection of a supply of AC power to a load and to a power supply grid according to claim 1 wherein, in the event of disconnection of the AC power output from the power supply grid or of loss of the grid voltage, said other reference is replaced by said one reference with which it is substantially overlapping in phase and amplitude so that said AC power generating system operates independently and continues substantially without interruption to supply the power required by the load.

3. A method of controlling connection of a supply of AC power to a load and to a power supply grid according to claim 1, wherein the source of power is controllable and provides a variable voltage and/or current electrical output, the AC power output generated by the converter for supply to the load being substantially independent of variations in the electrical output of the controllable source and said control unit being operable to control the operation of said controllable source as well as the operation of said converter.

4. A method of controlling connection of a supply of AC power to a load and to a power supply grid according to claim 3, including controlling the operation of said controllable source by said control unit in response to the monitored current and voltage of the AC power output when the AC power output is connected to the power supply grid so that active and reactive power that are transmitted to the power supply grid are adjusted and controlled in accordance with the voltage of the grid.

5. A method of controlling connection of a supply of AC power to a load and to a power supply grid according to claim 1, wherein the AC power output current for each phase is monitored between the inductor and the capacitor of an LC filter for that phase.

6. A method of controlling connection of a supply of AC power to a load and to a power supply grid according to claim 1, wherein said voltage reference signal is derived from said monitored grid voltage by feeding said monitored grid voltage to an input of a phase lock loop, said voltage reference signal being the output of said phase lock loop.

7. A method of controlling connection of a supply of AC power to a load and to a power supply grid according to claim 1 wherein said one reference is replaced by said other reference after said one output signal has been replaced by said voltage reference signal.

8. A method of controlling connection of a supply of AC power to a load and to a power supply grid according to claim 1 including deriving said other reference from said voltage reference signal.

9. A method of controlling connection of a supply of AC power to a load and to a power supply grid according to claim 8, wherein said other reference is also derived from an active power reference and a reactive power reference.

10. A method of controlling connection of a supply of AC power to a load and to a power supply grid according to claim 1, wherein said other reference is also derived from said monitored AC power output active current.

11. A method of controlling connection of a supply of AC power to a load and to a power supply grid according to claim 7, including reconnecting said one output signal to said voltage controller and replacing said other reference by said one reference in the event of disconnection of the AC power output from the power supply grid or loss of the grid voltage.

12. A system which controls connection of a supply of AC power to a load and to a power supply grid, the supply of AC power being generated by an AC power generating system of the kind that comprises a source of power arranged to provide an electrical output, a converter for generating an AC power output to supply the load from the electrical output, and a control unit operable to control the operation of the converter and thereby to supply the power required to the load both when the AC power output of the AC power generating system is connected to the power supply grid as well as to the load and during independent operation of the AC power generating system to supply the load including in the event of disconnection of the AC power output from the power supply grid, the control unit being operable in response to signals derived from sensed current and/or voltage of an electrical output which is generated by the converter from the electrical output of the source of power, the system being operable to monitor the current and voltage of the AC power output and the voltage of the power supply grid, to derive one reference from the monitored AC power output voltage, said one reference being for use as a reference in the operation of the converter to control the generation of that AC power output during independent operation of the AC power generating system to supply the load, and to derive another reference from the monitored grid voltage, said control unit being operable to replace said one reference by the other reference which is derived from the monitored grid voltage when the AC power output is connected to the power supply grid such that generation of the AC power output by the converter of the AC power generating system is controlled in accordance with the other reference that is derived from the monitored grid voltage when the AC power output of the AC power generating system is connected to the power supply grid as well as supplying the power required by the load so that the voltage of the AC power output is changed to correspond to the grid voltage in phase and frequency, the system including voltage reference generator means which are operable to produce one output signal and a voltage controller which is operable to compare the monitored AC power output voltage with said one output signal and thereby to produce said one reference;

wherein a voltage reference signal which is derived from the monitored grid voltage is fed to said voltage reference generator, said voltage reference generator being operable to modify said one output signal so as to change its phase and amplitude progressively towards those of said voltage reference signal, connection of said AC power output to the grid being delayed until after said one reference and said voltage reference signal are substantially overlapping in phase and amplitude, wherein the system further includes first a transfer switch operable once said one reference signal and said voltage reference signal are substantially overlapping in phase and amplitude, so that said voltage reference signal is fed to said voltage controller instead of said one output signal for comparison with said monitored AC output voltage to produce said one reference.

13. A system which controls connection of a supply of AC power to a load and to a power supply grid according to claim 12, wherein said control unit is operable to replace said other reference by said one reference with which said other reference is overlapping in phase and amplitude so that said AC power generating system operates independently and continues substantially without interruption to supply the power required by the load.

14. A system which controls connection of a supply of AC power to a load and to a power supply grid according to claim 12, wherein the source of power is controllable and provides a variable voltage and/or current electrical output, the AC power output generated by the converter for supply to the load being substantially independent of variations in the electrical output of the controllable source and said control unit being operable to control the operation of said controllable source as well as the operation of said converter.

15. A system which controls connection of a supply of AC power to a load and to a power supply grid according to claim 12, wherein said control unit that is operable to control the operation of the controllable source is responsive to the monitored current and voltage of the AC power output when the AC power output is connected to the power supply grid so that active and reactive power that are transmitted to the power supply grid are adjusted and controlled in accordance with the voltage of the grid.

16. A system which controls connection of a supply of AC power to a load and to a power supply grid according to claim 12, wherein the AC power output current for the each phase of the AC power output is monitored between the inductor and capacitor of an LC filter for that phase.

17. A system which controls connection of a supply of AC power to a load and to a power supply grid according to claim 12, including a phase lock loop having an input and an output, wherein said monitored grid voltage is fed to the input of the phase lock loop and said voltage reference signal is emitted from the output of said phase lock loop.

18. A system which controls connection of a supply of AC power to a load and to a power supply grid according to claim 12, including a second transfer switch operable once said one output signal has been replaced by said voltage reference signal, so that said one reference is replaced by said other reference.

19. A system which controls connection of a supply of AC power to a load and to a power supply grid according to claim 12, wherein said other reference is derived from said voltage reference signal.

20. A system which controls connection of a supply of AC power to a load and to a power supply grid according to claim 19, wherein said other reference is also derived from an active power reference and a reactive power reference.

21. A system which controls connection of a supply of AC power to a load and to a power supply grid according to claim 12, wherein said other reference is also derived from said monitored AC power output active current.

22. A system which controls connection of a supply of AC power to a load and to a power supply grid according to claim 18, wherein, the first and second transfer switches are operable to reconnect said one output signal to said voltage controller and to replace said other reference by said one reference so that said power supply apparatus operates independently in the event of disconnection of the AC power output of the AC power generating system from the power supply grid or of loss of grid voltage.

* * * * *